United States Patent
Mansour et al.

(10) Patent No.: US 10,756,876 B1
(45) Date of Patent: Aug. 25, 2020

(54) INTERFERENCE MITIGATION FOR WIRELESS SECTORS HAVING DIFFERENT SUBCARRIER SPACING

(71) Applicant: Sprint Spectrum LP, Overland Park, KS (US)

(72) Inventors: Nagi A. Mansour, Arlington, VA (US); Noman Alam, Chantilly, VA (US); Akin Ozozlu, McLean, VA (US); Shahzada Rasool, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/270,797

(22) Filed: Feb. 8, 2019

(51) Int. Cl.
  *H04L 1/18* (2006.01)
  *H04L 5/00* (2006.01)
  *H04W 72/08* (2009.01)
  *H04L 12/805* (2013.01)
  *H04W 36/00* (2009.01)

(52) U.S. Cl.
  CPC .......... *H04L 5/0073* (2013.01); *H04L 1/1893* (2013.01); *H04W 72/082* (2013.01); *H04L 47/365* (2013.01); *H04W 36/0069* (2018.08)

(58) Field of Classification Search
  CPC ......... H04N 1/00954; H04W 72/1278; H04W 72/02; H04W 72/06; H04W 36/0069; H04L 1/1893; H04L 47/365
  See application file for complete search history.

(56) References Cited

U.S. PATENT DOCUMENTS

| | | |
|---|---|---|
| 9,820,281 B1 * | 11/2017 | Werner ................. H04L 5/0007 |
| 10,038,581 B2 | 7/2018 | Zhang et al. |
| 2014/0087721 A1 * | 3/2014 | Dimou .................. H04W 24/02 455/423 |
| 2017/0325250 A1 * | 11/2017 | Manolakos ........... H04L 5/0007 |
| 2018/0049064 A1 | 2/2018 | Li et al. |
| 2018/0054292 A1 | 2/2018 | Yang et al. |
| 2018/0092002 A1 | 3/2018 | Manolakos et al. |

* cited by examiner

*Primary Examiner* — Salvador E Rivas (57) ABSTRACT

Mitigating interference in such potential interference areas of a wireless communication network includes determining that a first sector associated with a first wireless air interface and configured with a first subcarrier spacing is facing a second sector associated with a second wireless air interface and configured with a second subcarrier spacing, wherein the first and second subcarrier spacings are different, and assigning resources towards the second sector in a different order than resources assigned to the first sector.

14 Claims, 7 Drawing Sheets

INTERFERENCE MITIGATION FOR WIRELESS SECTORS HAVING DIFFERENT SUBCARRIER SPACING

TECHNICAL BACKGROUND

A heterogeneous network can be configured to include various types of access nodes that are configured to deploy wireless air interfaces of different types, such as long-term evolution (LTE), 5G new radio (NR), and so on. Although these different wireless air interfaces or sectors may be configured differently (i.e. with different subcarrier spacing, frame configuration, etc.), the physical resources such as frequencies and physical resource blocks utilizing said frequencies may overlap. Thus, when a two or more differently-configured access nodes or sectors deployed therefrom overlap, in terms of coverage area and/or physical resources, signal interference may occur in these overlapping areas. Such interference may occur, for instance, at the edges of the access nodes due to overlapping with other access nodes, and may degrade data transmission near coverage area edges, reducing data throughput and spectral efficiency to wireless devices located within or nearby such overlapping coverage areas. Existing methods to mitigate interference such as inter-cell interference coordination (ICIC) or scheduling schemes comprising almost blank subframes (ABS) require repeated communication between the cells, which increases overhead, or lose capacity due to muting resource blocks that could otherwise be used to carry traffic.

Overview

Exemplary embodiments described herein include systems, methods, and nodes for mitigating interference in wireless communication networks. For instance, a method for mitigating interference in such potential interference areas of a wireless communication network includes determining that a first sector associated with a first wireless air interface and configured with a first subcarrier spacing is facing a second sector associated with a second wireless air interface and configured with a second subcarrier spacing, wherein the first and second subcarrier spacings are different, and assigning resources towards the second sector in a different order than resources assigned to the first sector.

In another exemplary embodiment, a system for mitigating interference in a wireless communication network includes a processing node and a processor coupled to the processing node. The processor may be configured to perform operations including determining one or more potential interference areas between a first access node and a second access node, and scheduling resources towards the second access node in a different order than resources scheduled towards the first access node.

In yet another exemplary embodiment, a processing node for mitigating interference in a wireless communication network is configured to perform operations comprising determining that a first sector deployed by a first access node and configured with a first subcarrier spacing shares an overlapping coverage area with a second sector deployed by a second access node and configured with a second subcarrier spacing, wherein the first and second subcarrier spacings are different; and scheduling resources towards the first sector in a different order than resources scheduled towards the second sector.

DETAILED DESCRIPTION

The disclosed embodiments illustrate devices, systems, and methods to reduce interference in wireless networks having a plurality of access nodes deploying sectors having different subcarrier spacings and overlapping coverage areas. Such overlapping areas may be referred to as potential interference areas. An exemplary method for mitigating interference in such potential interference areas of a wireless communication network includes determining that a first sector associated with a first wireless air interface and configured with a first subcarrier spacing is facing a second sector associated with a second wireless air interface and configured with a second subcarrier spacing, wherein the first and second subcarrier spacings are different, and assigning resources towards the second sector in a different order than resources assigned to the first sector. The first wireless air interface may be deployed by a first access node, and the second wireless air interface may be deployed by a second access node proximate to the first access node. Determining that the first sector is facing the second sector may be based on determining or identifying an overlap region in a coverage area of each of the first and second wireless air interfaces. For example, the overlap region comprises a first portion of the first sector that overlaps a second portion of the second sector. Determining or identifying the overlap region may be based on receiving an indication of interference from a wireless device located in the overlap region. For example, the assigning resources towards the second sector in the different order may be triggered by receiving the indication of interference. In further exemplary embodiments, a third sector deployed by a third access node may be identified as facing a fourth sector deployed by the first access node, the third sector being configured with a third subcarrier spacing that is different from the first and second subcarrier spacings. In this embodiment, resources are assigned towards the third sector in a different order than resources assigned to the first sector.

In exemplary embodiments illustrated herein, the resources comprise physical resources that are arranged in grids of different sizes for different subcarrier spacings. For example, a first plurality of grids of a first size is associated with the first subcarrier spacing, and a second plurality of grids of a second size is associated with the second subcarrier spacing. The sizes may be based on, for example, an arrangement of physical resource blocks in a frequency and/or time domain, as further described herein. In addition, each grid in the first and second pluralities of grids may be consecutively numbered, and same-numbered grids in each of the first and second plurality of grids comprise overlapping physical resources. For example, a resource grid numbered 0 or 1 and associated with a 15 KHz subcarrier spacing may include the same physical resources as a resource grid numbered 0 or 1 and associated with a 30 KHz subcarrier spacing, despite the resource grids being of different sizes. Consequently, assigning resources towards the second sector in a different order than resources assigned to the first sector can include assigning the first plurality of grids to the first sector in a first sequence and assigning the second plurality of grids to the second sector in a second sequence that is different than the first sequence. These differently-sequenced allocations of resources for each sector limit the contemporaneous usage of overlapping resources, thereby generally reducing the probability of interference occurring across a wireless network, and provide better interference reduction compared to currently proposed techniques that require coordination between access nodes, or muting of resource blocks in the overlapping sectors. Further, the reduction in interference results in an increase in system capacity per sector of each cell. In an exemplary embodiment, the second sequence is in a reverse order of the first sequence.

In further embodiments described herein, a system for mitigating interference in a wireless communication network includes a processing node and a processor coupled to the processing node. The processor may be configured to perform operations including determining one or more potential interference areas between a first access node and a second access node, and scheduling resources towards the second access node in a different order than resources scheduled towards the first access node. Determining the one or more potential interference areas can include determining that a first sector deployed by the first access node and configured with a first subcarrier spacing is facing a second sector deployed by the second access node and configured with a second subcarrier spacing, wherein the first and second subcarrier spacings are different. An overlap region may be identified in a coverage area of each of the first and second sectors. Further, scheduling resources towards the second access node in a different order than resources scheduled towards the first access node can include scheduling resources towards the second access node in a reverse order than resources scheduled towards the first access node. The resources can comprise physical resources that are arranged in a first type of grid for the first sector and a second type of grid for the second sector, the first and second types of grids being sized differently. A first plurality of grids of the first type is assigned to the first sector in a first sequence, and a second plurality of grids of the second type is assigned to the second sector in a reverse order of the first sequence. The operations can further include determining one or more additional potential interference areas between a first access node and a third access node, and scheduling resources towards the third access node in a different order than resources scheduled towards the first access node. Further, these operations may be performed by a scheduling entity or a processing node communicatively coupled to an access node or other network node, as further described below with reference to the embodiments depicted in FIGS. 1-7.

Figure 1:
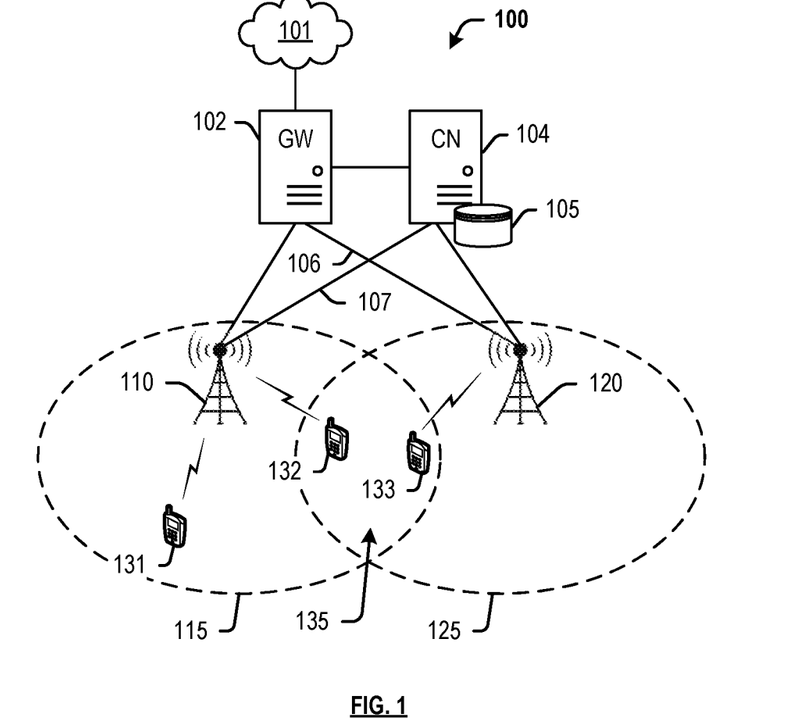
FIG. 1 illustrates an exemplary system for mitigating interference.

FIG. 1 depicts an exemplary system 100 for mitigating interference in wireless networks. System 100 comprises a communication network 101, gateway 102, controller node 104, access nodes 110 and 120, and wireless devices 131, 132, and 133. Access node 110 is illustrated as having a coverage area 115, and access node 120 is illustrated as having a coverage area 125. Wireless devices 131, 132 are located within coverage area 115 and access network services from access node 110. Wireless device 133 is located within coverage area 125 and accesses network services from access node 120. Further, wireless devices 132 and 133 are located within potential interference area 135 formed by an overlap of coverage areas 115, 125. For example, access nodes 110, 120 may be configured to deploy sectors having different subcarrier spacings, and potential interference area 135 may comprise any overlapping coverage area of sectors having different subcarrier spacings. Thus, and as further described herein, interference mitigation operations are performed to avoid interference experienced in potential interference area 135 to wireless devices 132, 133, access nodes 110, 120, or any other network node subject to interference within potential interference area 135 or other potential interference areas.

For example, a scheduling entity (within, for example, one or both of access nodes 110, 120, or controller node 104) may be configured to minimize interference experienced within potential interference area 135 by determining that a first sector associated with a first wireless air interface deployed by access node 110 and configured with a first subcarrier spacing is facing a second sector associated with a second wireless air interface deployed by access node 120 and configured with a second subcarrier spacing that is different than the first subcarrier spacing. For example, in a 5G network, the first subcarrier spacing may be 15 KHz, and the second subcarrier spacing may be 30 KHz. The scheduler is configured to assign resources towards the second sector in a different order than resources assigned to the first sector. Determining that the first sector is facing the second sector may be based on determining or identifying an overlap region 135 in a coverage area of each of the first and second wireless air interfaces. Determining or identifying the overlap region 135 may be based on receiving an indication of interference from a wireless device located in the overlap region 135, such as one or both of wireless devices 132, 133. For example, the assigning resources towards the second sector in the different order may be triggered by receiving the indication of interference.

Further, the resources comprise physical resources that are arranged in grids of different sizes for different subcarrier spacings. For example, a first plurality of grids of a first size is associated with the first subcarrier spacing utilized by access node 110, and a second plurality of grids of a second size is associated with the second subcarrier spacing utilized by access node 120. The sizes may be based on, for example, an arrangement of physical resource blocks in a frequency and/or time domain, as further described with reference to FIGS. 5A and 5B. In addition, each grid in the first and second pluralities of grids may be consecutively numbered, and same-numbered grids in each of the first and second plurality of grids comprise overlapping physical resources. For example, a resource grid numbered 0 or 1 and associated with a 15 KHz subcarrier spacing may include the same physical resources as a resource grid numbered 0 or 1 and associated with a 30 KHz subcarrier spacing, despite the resource grids being of different sizes. Consequently, assigning resources towards the second sector in a different order than resources assigned to the first sector can include assigning the first plurality of grids to the first sector in a first sequence and assigning the second plurality of grids to the second sector in a second sequence that is different than the first sequence. These differently-sequenced allocations of resources for each sector limit the contemporaneous usage of overlapping resources within potential interference area 135, thereby generally reducing the probability of interference occurring across a wireless network. For example, the second sequence is in a reverse order of the first sequence, which reduces the occurrence of overlapping resources being utilized by both access nodes 110, 120 at the same time. These operations may be extended to receiving an indication of a second potential interference area caused by an additional neighboring access node, as further illustrated in FIG. 6, and performing the aforementioned operations for all access nodes, so as to distribute the interference and minimize repeated interference in the same region. Further, one or more of access nodes 110, 120 may comprise logic for performing operations including determining a potential interference area 135 between coverage areas 115, 125, and rotating between resources assigned to access nodes 110 or 120, such that the sectors/antennae that service the potential interference area 135 use different resource block sets. Further, in 5G networks, generally available subcarrier spacings include 15 KHz, 30 KHz, 60 KHz, 120 KHz, 240 KHz, and so on, with each subcarrier spacing being associated with a different arrangement of resources or resource grids.

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as coordinates of potential interference area 135, subcarrier spacings of sectors deployed within coverage areas 115, 125, positions of wireless devices 131, 132, 133, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
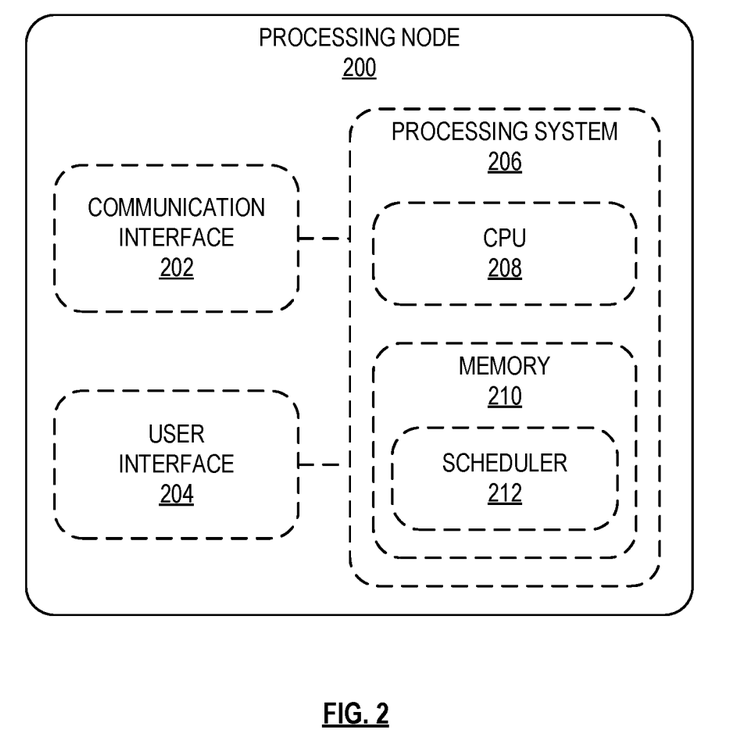
FIG. 2 illustrates an exemplary processing node for mitigating interference.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a scheduler 212, which may be executed to perform the interference mitigation operations described herein. Processing system 206 may include other circuitry to retrieve and execute software from memory 210 (including scheduler 212). Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
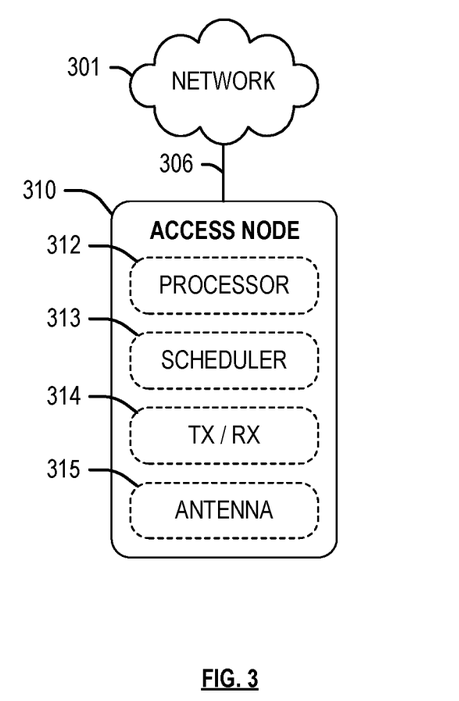
FIG. 3 illustrates an exemplary access node for mitigating interference.

FIG. 3 depicts an exemplary access node 310. Access node 310 may be configured as an access point for providing network services from network 301 to end-user wireless devices via a radio-air interface deployed therefrom. Access node 310 is illustrated as comprising a processor 312, a scheduler 313 for performing the scheduling operations recited herein in conjunction with processor 312, a transceiver 314, and antenna 315 for deploying a radio air interface. One pair of transceivers and antennae are illustrated herein solely to simplify the written description, and it may be evident to those having ordinary skill in the art, that any combination of transceivers and antennae may be incorporated in order to deploy different sectors that are configured with different subcarrier spacings, as well as formed beams, MU-MIMO data streams, and/or to facilitate communication with other network nodes on network 301. Further, access node 310 is communicatively coupled to network 301 via communication interface 306, which may be any wired or wireless link as described above.

Figure 4:
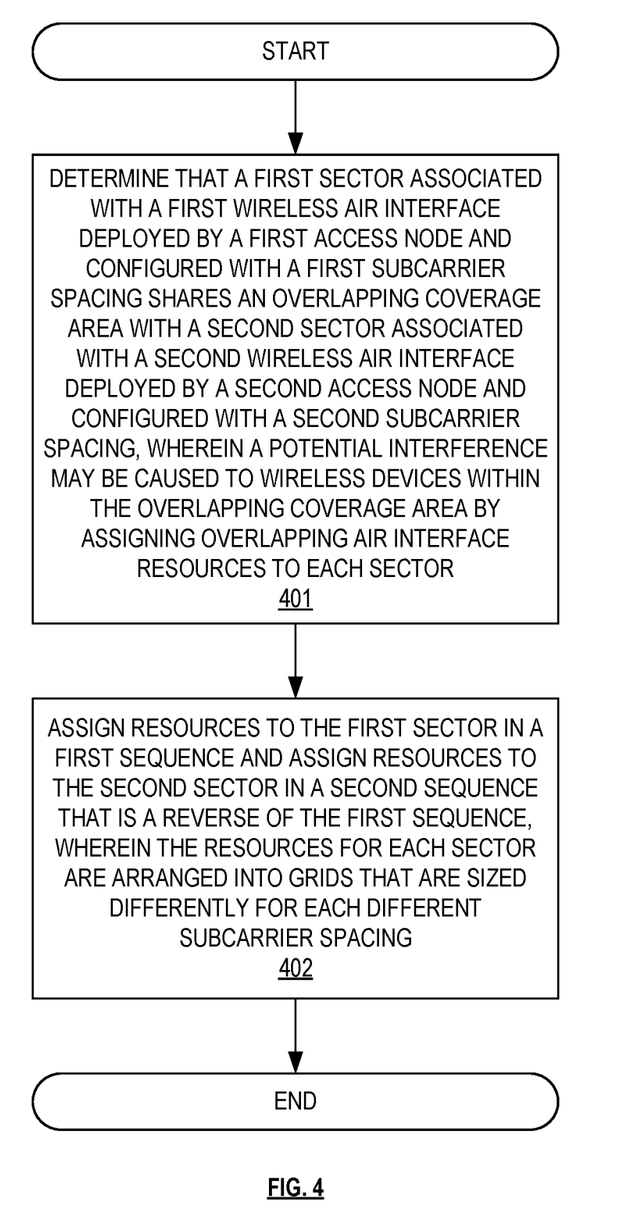
FIG. 4 illustrates an exemplary method for mitigating interference.

FIG. 4 illustrates an exemplary method for mitigating interference. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 401, a potentially interfering region is identified between two or more opposite-facing sectors. For example, two or more access nodes deploying sectors having different subcarrier spacings and overlapping coverage areas may be identified as potentially interfering regions. Further, determining that a first sector associated with a first wireless air interface and configured with a first subcarrier spacing is facing a second sector associated with a second wireless air interface and configured with a second subcarrier spacing may be based on determining or identifying the overlap region in a coverage area of each of the first and second wireless air interfaces.

Further, determining or identifying the overlap region may be based on receiving an indication of interference from a wireless device located in the overlap region. For example, a signal condition of the wireless devices can be indicative of interference based on a signal characteristic such as a received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR). If sufficient interference is detected, for instance if the received interference reports/indicators exceed a threshold, then a determination is made as to the presence of a potential interference area.

At 402, resources are assigned to each sector based on the determination of interference (or potential interference) in step 401. For example, the assigning resources towards the second sector in the different order may be triggered by receiving the indication of interference. The resources can include physical resources that are arranged in grids of different sizes for different subcarrier spacings. For example, a first plurality of grids of a first size is associated with the first subcarrier spacing, and a second plurality of grids of a second size is associated with the second subcarrier spacing. The sizes may be based on, for example, an arrangement of physical resource blocks in a frequency and/or time domain, as further described herein. In addition, each grid in the first and second pluralities of grids may be consecutively numbered, and same-numbered grids in each of the first and second plurality of grids comprise overlapping physical resources. For example, a resource grid numbered 0 or 1 and associated with a 15 KHz subcarrier spacing may include the same physical resources as a resource grid numbered 0 or 1 and associated with a 30 KHz subcarrier spacing, despite the resource grids being of different sizes. Consequently, assigning resources towards the second sector in a different order than resources assigned to the first sector can include assigning the first plurality of grids to the first sector in a first sequence and assigning the second plurality of grids to the second sector in a second sequence that is different than the first sequence. These differently-sequenced allocations of resources for each sector limit the contemporaneous usage of overlapping resources, thereby generally reducing the probability of interference occurring across a wireless network, and provide better interference reduction compared to currently proposed techniques that require coordination between access nodes, or muting of resource blocks in the overlapping sectors. Further, the reduction in interference results in an increase in system capacity per sector of each cell. In an exemplary embodiment, the second sequence is in a reverse order of the first sequence.

Meanwhile, FIGS. 5A-5B and 6A-6B illustrate exemplary resource grids in a frequency/time domain and sequences scheduled for opposite facing access nodes. As described herein, physical resources may be arranged in grids of different sizes for different subcarrier spacings. For example, with reference to FIG. 5A, a first plurality of grids of a first size is associated with a 15 KHz subcarrier spacing, and a second plurality of grids of a second size is associated with a 30 KHz subcarrier spacing. The sizes may be based on, for example, an arrangement of physical resource blocks in a frequency and/or time domain. For example, the grids associated with the 15 KHz subcarrier spacing occupy fewer frequency resources relative to the grids associated with the 30 KHz subcarrier spacing, but may cover a greater time period (or increased number of time slots). In addition, each grid in the first and second pluralities of grids may be consecutively numbered, and same-numbered grids in each of the first and second plurality of grids comprise overlapping physical resources. For example, resource grid labeled $0_{15KHz}$ (that is, numbered 0 and associated with the 15 KHz subcarrier spacing) may include the same physical resources as resource grids labeled $0_{30KHz}$ and $1_{30KHz}$ (that is, numbered 0 and 1 and associated with the 30 KHz subcarrier spacing), despite the resource grids being of different sizes. Similarly, resource grid labeled $1_{15KHz}$ (that is, numbered 1 and associated with the 15 KHz subcarrier spacing) may include the same physical resources as resource grids labeled $2_{30KHz}$ and $3_{30KHz}$ (that is, numbered 2 and 3 and associated with the 30 KHz subcarrier spacing), resource grid labeled $2_{15kHz}$ (that is, numbered 2 and associated with the 15 KHz subcarrier spacing) may include the same physical resources as resource grids labeled $4_{30KHz}$ and $5_{30KHz}$ (that is, numbered 4 and 5 and associated with the 30 KHz subcarrier spacing), and so on.

Figure 5A:
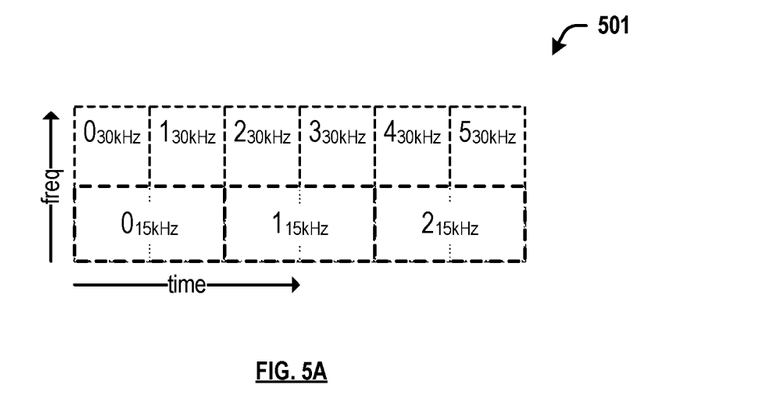
FIGS. 5A and 5B illustrate exemplary resource block grids for different subcarrier spacings in a time domain.
Figure 5B:
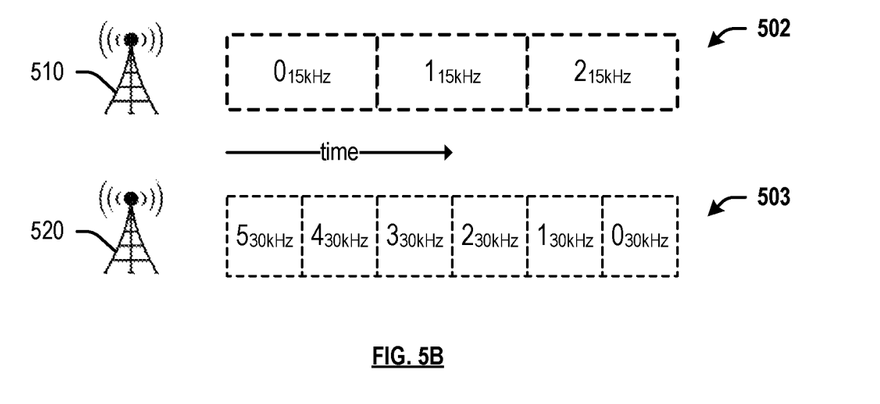

Consequently, resources are assigned in different sequences to each of access nodes 510, 520. With reference to FIG. 5B, the first plurality of grids is assigned to a first sector deployed by access node 510 in a first sequence 502 (e.g. 0, 1, 2), and the second plurality of grids is assigned to the second sector deployed by access node 520 in a second sequence 503 that is different than the first sequence (e.g. 5, 4, 3, 2, 1, 0). These differently-sequenced allocations of resources for each sector limit the contemporaneous usage of overlapping resources, thereby generally reducing the probability of interference occurring across a wireless network, and provide better interference reduction compared to currently proposed techniques that require coordination between access nodes, or muting of resource blocks in the overlapping sectors. Further, the reduction in interference results in an increase in system capacity per sector of each cell.

Figure 6A:
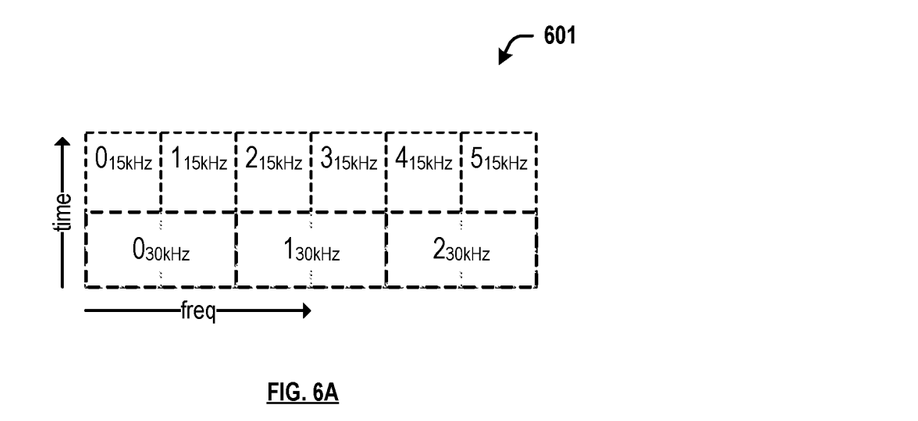
FIGS. 6A and 6B illustrate exemplary resource block grids for different subcarrier spacings in a frequency domain.
Figure 6B:
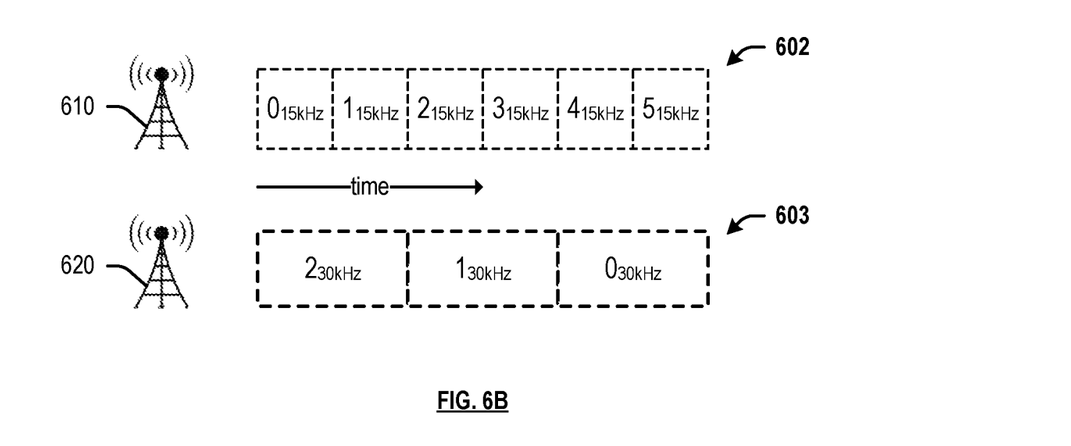

FIGS. 6A-6B illustrate a different arrangement of resources for the different subcarrier spacings and sequences assigned thereto. For example, with reference to FIG. 6A, a first plurality of grids of a first size is associated with a 15 KHz subcarrier spacing, and a second plurality of grids of a second size is associated with a 30 KHz subcarrier spacing. The sizes may be based on, for example, an arrangement of physical resource blocks in a frequency and/or time domain. The difference here versus the arrangement of FIG. 5A is that the resource grids for the 15 KHz subcarrier spacing occupy different frequencies on the x-axis, such that resource grids labeled $0_{15KHz}$ to $1_{15KHz}$ (that is, numbered 0 and 1 and associated with the 15 KHz subcarrier spacing) may include the same frequencies as resource grid labeled $0_{30KHz}$ (that is, numbered 0 and associated with the 30 KHz subcarrier spacing), despite the resource grids being of different sizes. Similarly, resource grids labeled $2_{15kHz}$ and $3_{15kHz}$ (that is, numbered 2 and 3 and associated with the 15 KHz subcarrier spacing) may include the same physical resources as resource grid labeled $1_{30KHz}$ (that is, numbered 1 and associated with the 30 KHz subcarrier spacing), and resource grids labeled $4_{15kHz}$ and $5_{15kHz}$ (that is, numbered 4 and 5 and associated with the 15 KHz subcarrier spacing) may include the same physical resources as resource grid labeled $2_{30KHz}$ (that is, numbered 2 and associated with the 30 KHz subcarrier spacing), and so on.

Consequently, resources are assigned in different sequences to each of access nodes 610, 620. With reference to FIG. 6B, the first plurality of grids is assigned to a first sector deployed by access node 610 in a first sequence 602 (e.g. 0, 1, 2, 3, 4, 5), and the second plurality of grids is assigned to the second sector deployed by access node 620 in a second sequence 603 that is different than the first sequence (e.g. 2, 1, 0). These differently-sequenced allocations of resources for each sector limit the contemporaneous usage of overlapping resources, thereby generally reducing the probability of interference occurring across a wireless network, and provide better interference reduction compared to currently proposed techniques that require coordination between access nodes, or muting of resource blocks in the overlapping sectors. Further, the reduction in interference results in an increase in system capacity per sector of each cell.

In addition to the arrangements illustrated in FIGS. 5A-5B and 6A-6B, any arrangement may be used depending on a number of access nodes and sectors that the resources are allocated to, their respective subcarrier spacing, and other factors, such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, a utilization of resource blocks in a frame, carrier or channel, an amount of uplink and/or downlink traffic associated with each wireless device, the total bandwidth available for scheduling communication at each access node, etc. The load on the network can comprise a total amount of traffic associated with each network node in the backhaul of the wireless network, a throughput of each network node, a processing load at each network node, and any delay associated with each network node.

Figure 7:
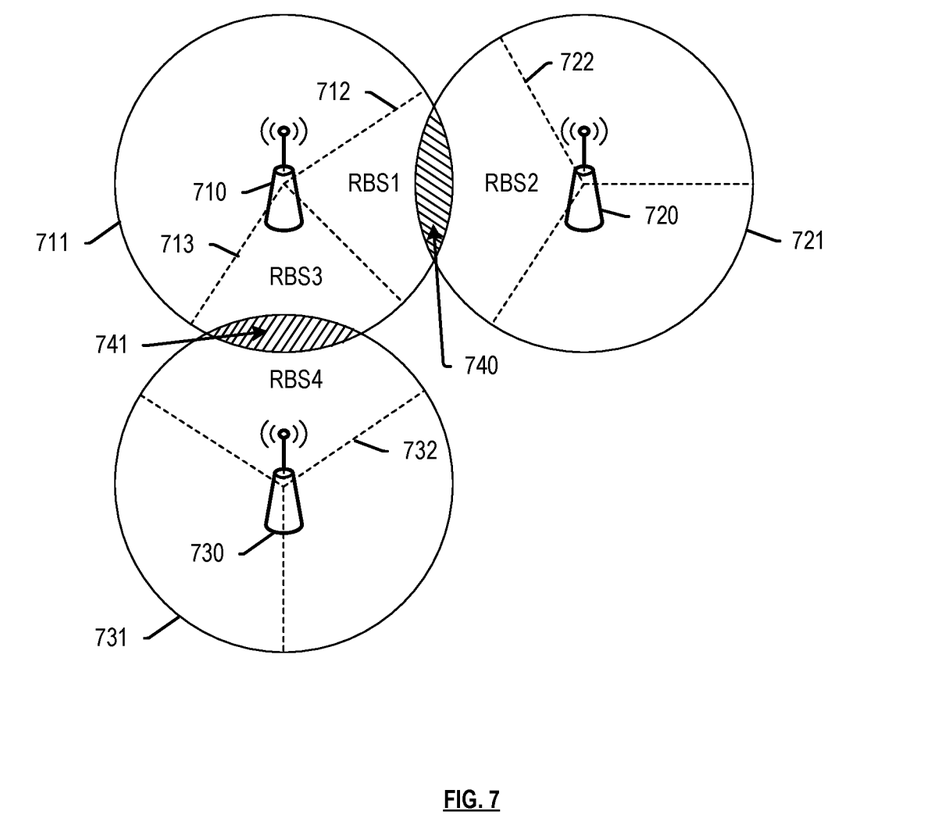
FIG. 7 illustrates exemplary resource allocations for overlapping sectors of neighboring access nodes.

FIG. 7 illustrates an exemplary allocation of resources among a plurality of access nodes. Access nodes 710, 720, and 730 are each configured to deploy at least one opposite-facing sector, and share the same total resources that may be arranged and/or scheduled differently for each access node. For example, each access node 710, 720, and 730 has a corresponding signal range or coverage area 711, 721, and 731. The ranges 711, 721, and 731 overlap in potential interference area 740, between sector 712 of access node 710 and sector 722 of access node 720, and potential interference area 741, between sector 713 of access node 710 and sector 732 of access node 730. Further, each sector 712, 713, 722, and 732 may be configured with a different subcarrier spacing. Thus, resources can be assigned to each sector 712, 713, 722, and 732 in a different order so as to minimize the potential for each opposite facing sector utilizing the same resources at the same time. For example, a first set RBS1 of resources (or resource grids) may be assigned to sector 712 in a different order or arrangement than a second set of resources RBS2 assigned to sector 722. Similarly, a third set of resources RBS3 may be assigned to sector 713 in a different order or arrangement than a fourth set of resources RBS4 assigned to sector 732. Therefore, potential interference in these regions is mitigated. Various additional combinations may be conceivable to those having ordinary skill in the art in light of this disclosure. For example, resource assignments may be randomly assigned, or otherwise allocated such that the randomized allocation of each access node is different. Ongoing re-assignments may be performed based on real-time interference reports.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in a wireless communication network the method comprising:
   determining that a first sector associated with a first wireless air interface and configured with a first subcarrier spacing is facing a second sector associated with a second wireless air interface and configured with a second subcarrier spacing, wherein the first and second subcarrier spacings are different;
   identifying, in the network, physical resources arranged in grids including a first plurality of grids of a first size corresponding to the first subcarrier spacing and a second plurality of grids of a second size corresponding to the second subcarrier spacing, the first and second plurality of grids being consecutively numbered, wherein same-numbered grids in each of the first and second plurality of grids comprise overlapping physical resources; and
   assigning the physical resources towards the second sector in a different order than the physical resources assigned to the first sector by assigning the first plurality of grids to the first sector in a first sequence and assigning the second plurality of grids to the second sector in a second sequence, wherein the second sequence is different from the first sequence in order to reduce contemporaneous usage of the physical resources by the first sector and the second sector.

2. The method of claim 1, wherein:
   the first wireless air interface is deployed by a first access node, and the second wireless air interface is deployed by a second access node proximate to the first access node.

3. The method of claim 2, wherein determining that the first sector is facing the second sector comprises determining an overlap region in a coverage area of each of the first and second wireless air interfaces.

4. The method of claim 3, wherein the overlap region comprises a first portion of the first sector that overlaps a second portion of the second sector.

5. The method of claim 3, further comprising:
receiving an indication of interference from a wireless device located in the overlap region, wherein assigning the physical resources towards the second sector in the different order is triggered by receiving the indication of interference.

6. The method of claim 3, further comprising:
determining that a third sector deployed by a third access node is facing a fourth sector deployed by the first access node, the third sector being configured with a third subcarrier spacing that is different from the first and second subcarrier spacings; and
assigning the physical resources towards the third sector in a reverse order than resources assigned to the first sector.

7. The method of claim 1, wherein the second sequence is in a reverse order of the first sequence.

8. A system for mitigating interference in a wireless communication network, the system comprising:
a processing node; and
a processor coupled to the processing node, the processor being configured to perform operations comprising:
determining one or more potential interference areas between a first access node and a second access node, the first access node having a first subcarrier spacing and the second node having a second subcarrier spacing;
identifying, in the network, physical resources arranged in grids including a first plurality of grids of a first size corresponding to the first subcarrier spacing and a second plurality of grids of a second size corresponding to the second subcarrier spacing, the first and second plurality of grids being consecutively numbered, wherein same-numbered grids in each of the first and second plurality of grids comprise overlapping physical resources; and
scheduling the physical resources towards the second access node in a different order than resources scheduled towards the first access node by scheduling the physical resources toward the first access node in a first sequence and scheduling the physical resources toward the second access node in a second sequence that is different from the first sequence to reduce contemporaneous usage of the physical resources.

9. The system of claim 8, wherein:
determining the one or more potential interference areas comprises determining that a first sector deployed by the first access node and configured with the first subcarrier spacing is facing a second sector deployed by the second access node and configured with the second subcarrier spacing, and
the first and second subcarrier spacings are different.

10. The system of claim 9, wherein the operations further comprise determining an overlap region in a coverage area of each of the first and second sectors.

11. The system of claim 9, wherein scheduling the physical resources towards the second access node in a different order than the physical resources scheduled towards the first access node comprises scheduling the physical resources towards the second access node in a reverse order than the physical resources scheduled towards the first access node.

12. The system of claim 11, wherein the operations further comprise:
determining one or more additional potential interference areas between a first access node and a third access node; and
scheduling the physical resources towards the third access node in a different order than the physical resources scheduled towards the first access node.

13. A processing node for mitigating interference in a wireless communication network,
the processing node being configured to perform operations comprising:
determining that a first sector deployed by a first access node and configured with a first subcarrier spacing shares an overlapping coverage area with a second sector deployed by a second access node and configured with a second subcarrier spacing, wherein the first and second subcarrier spacings are different;
identifying, in the network, physical resources arranged in grids including a first plurality of grids of a first size corresponding to the first subcarrier spacing and a second plurality of grids of a second size corresponding to the second subcarrier spacing, the first and second plurality of grids being consecutively numbered, wherein same-numbered grids in each of the first and second plurality of grids comprise overlapping physical resources; and
scheduling the physical resources towards the first sector in a different order than the physical resources scheduled towards the second sector by scheduling the first plurality of grids to the first sector in a first sequence and assigning the second plurality of grids to the second sector in a second sequence, wherein the second sequence is different from the first sequence in order to reduce contemporaneous usage of the physical resources by the first sector and the second sector.

14. The processing node of claim 13, wherein the second sequence is in a reverse order of the first sequence.

* * * * *